United States Patent [19]

Ide et al.

[11] Patent Number: 5,590,401
[45] Date of Patent: Dec. 31, 1996

[54] SELECTIVE-CALLING RECEIVER WITH BATTERY SWITCHING UPON CPU STOP DETECTION

[75] Inventors: Motoki Ide, Tokyo; Hiroaki Shibayama, Shizuoka, both of Japan

[73] Assignee: NEC Corporation, Japan

[21] Appl. No.: 228,962

[22] Filed: Apr. 18, 1994

[30] Foreign Application Priority Data

Apr. 16, 1993 [JP] Japan .................................. 5-113925

[51] Int. Cl.⁶ .................................................. H04Q 7/18
[52] U.S. Cl. .................... 455/38.3; 455/343; 340/825.44
[58] Field of Search .................................. 455/38.3, 343, 455/38.2, 127, 89; 340/825.44; 307/18, 23

[56] References Cited

U.S. PATENT DOCUMENTS 4,908,523  3/1990  Snowden et al. ...................... 307/18 X
5,272,475  12/1993  Eaton et al. ........................ 340/825.44

Primary Examiner—Reinhard J. Eisenzopf
Assistant Examiner—Philip J. Sobutka
Attorney, Agent, or Firm—Ostrolenk, Faber, Gerb & Soffen, LLP

[57] ABSTRACT

A radio selective calling receiver including an exchangeable first battery and a second battery which can be charged by the first battery. A CPU stops operating at a stop voltage. A RAM stores a user data. A stop detector detects operational stop of the CPU. A power supply changer changes one of the first and second batteries into the other and selectively supplies one of electric energies of the batteries to the CPU, RAM and stop detector. The minimum operable voltages of the RAM and the stop detector are lower than the stop voltage. The first battery supplies its electric energy to the CPU, RAM and stop detector until the supply voltage of the first battery lowers to the stop voltage. The power supply changer changes the first battery into the second battery when the operational stop of the CPU is detected, so that the second battery supplies its electric energy to the CPU, RAM and stop detector until the first battery thus lowered in supply voltage is exchanged by a new one. The capacity of the first battery can be effectively used without any malfunction of the receiver and no troublesome reinput action is required for the user.

15 Claims, 3 Drawing Sheets

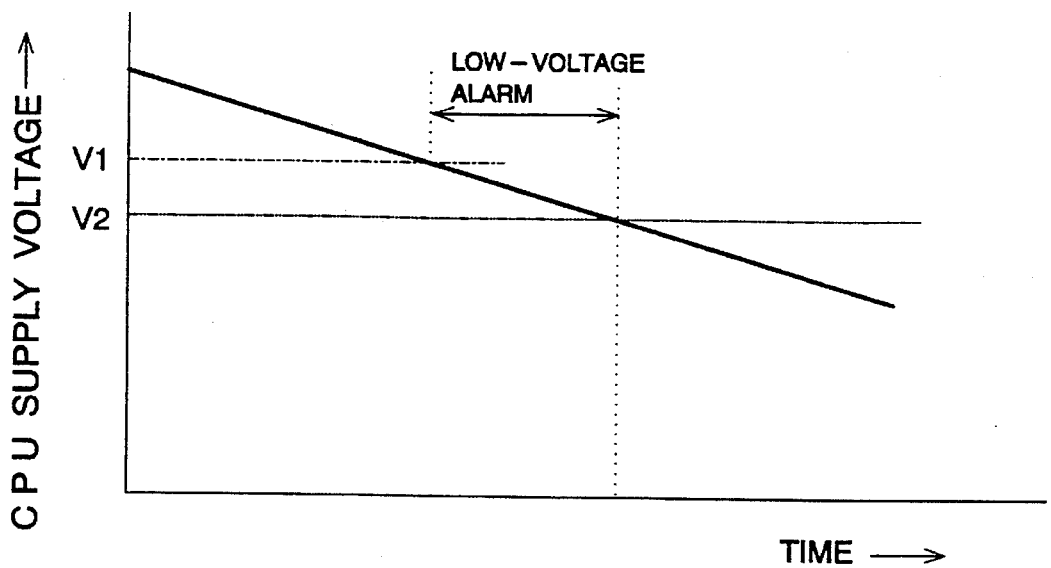
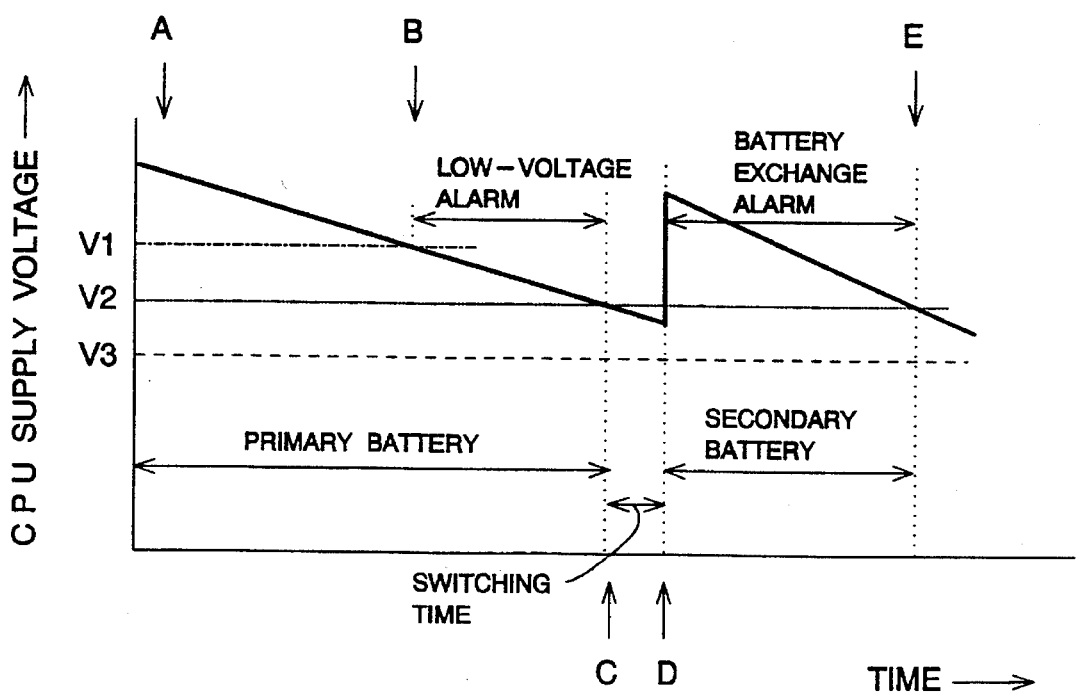

SELECTIVE-CALLING RECEIVER WITH BATTERY SWITCHING UPON CPU STOP DETECTION

BACKGROUND OF THE INVENTION

1. Field of the Invention

The present invention relates to a selective-calling radio receiver such as a pager and more particularly, to a selective-calling radio receiver equipped with an exchangeable battery such as a dry battery as its power supply.

2. Description of the Prior Art

A conventional selective-calling radio receiver or a pager has a voltage monitoring circuit for monitoring the voltage of a primary battery incorporated therein as its power supply in order to avoid malfunction due to voltage reduction of the battery. The monitoring circuit causes a Central Processing Unit (CPU) of the receiver to generate an alarm signal for exchanging the battery when the battery voltage thus monitored becomes lower than a given reference voltage. The user or holder exchanges the battery in response to the alarm signal.

FIG. 1 shows a time chart for explaining the operation of the receiver. It is seen from FIG. 1 that the voltage of the battery reduces as the times go by and a Low-Voltage Alarm (LVA) is produced when the voltage becomes to a first reference voltage $V_1$.

As shown in FIG. 1, usually, the first reference voltage $V_1$ is set to be a little higher than a second reference voltage $V_2$ which is called as a "CPU stop voltage" here. The CPU becomes to stop or malfunction if the voltage of the battery lowers to the CPU stop voltage $V_2$.

The first reference voltage $V_1$ is higher than the second reference voltage $V_2$, so that the CPU does not stop immediately even if the voltage of the battery lowers to the first reference voltage $V_1$. As a result, the holder of the receiver has a sufficient time for exchanging the battery after the LVA alarm is produced.

Also, in the case that the conventional receiver is provided with an alarm means for producing the LVA alarm such as a vibrator through which a large current flows, the alarm means start to operate when the battery voltage becomes to the first reference voltage $V_1$, so that the CPU is difficult to stop even if the battery voltage lowers than the first reference voltage $V_1$ momentarily due to operation of the alarm means.

In this case, the CPU sometimes stops to operate because the battery voltage momentarily drops to the second reference voltage $V_2$ and restarts to operate. The data stored in the Random Access Memory (RAM) of the receiver is initialized together with the restart. Therefore, there arises a problem that peculiar user data stored in the RAM disappears and the user must reinput his data into the RAM, which requires the user for some troublesomeness.

In addition, as described above, with the conventional selective-calling radio receiver, the alarm starts to produce when the battery voltage lowers to the first reference voltage $V_1$ which is higher than the second reference voltage or the CPU stop voltage $V_3$. Therefore, the holder or user is obliged to exchange the battery whose capacity is not exhausted completely in response to the alarm.

As a result, there is another problem that the remaining capacity of the battery is not used effectively, which means that the remaining capacity is wasted.

SUMMARY OF THE INVENTION

Accordingly, an object of the present invention is to provide a selective-calling radio receiver in which the battery capacity can be effectively used without malfunction of the receiver.

Another object of the present invention is to provide a selective-calling radio receiver which ensures to maintain the user data stored in the RAM within the receiver and which requires no troublesome reinput action to the user.

A selective-calling radio receiver of the present invention includes an exchangeable first battery as a first power supply, a second battery as a second power supply which can be charged by the first battery, a CPU which stops operating when the supply voltage of the first battery lowers to a stop voltage, a RAM for storing a user data, a stop detector for detecting operational stop of the CPU, and a power supply changer for changing one of the first and second batteries into the other and for selectively supplying one of electric energies of the first and second batteries to the CPU, RAM and stop detector.

The minimum operable voltages of the RAM and the stop detector are lower than the stop voltage.

The first battery supplies its electric energy to the CPU, RAM and stop detector until the supply voltage of the first battery lowers to the stop voltage. The power supply changer changes the first battery into the second battery when the operational stop of the CPU is detected by the stop detector, so that the second battery supplies its electric energy to the CPU, RAM and stop detector until the first battery thus lowered in supply voltage is exchanged by a new one.

With the selective-calling radio receiver according to the present invention, the first battery supplies its electric energy to the CPU, RAM and stop detector until the supply voltage of the first battery lowers to the stop voltage and the power supply changer changes the first battery into the second battery when the operational stop of the CPU is detected. Therefore, the capacity of the first battery can be effectively used.

Also, since the minimum operable voltages of the RAM and the stop detector are lower than the stop voltage, there arises no malfunction of the receiver even if the CPU stops operating due to supply voltage drop of the first battery.

Further, since the minimum operable voltage of the RAM is lower than the stop voltage, the RAM operates normally even if the CPU stops operating. As a result, the user data stored in the RAM is surely maintained without change, which means that no troublesome reinput action is required for the user.

Preferably, there are provided with a voltage detector for detecting a supply voltage of the first battery and a first alarm generator for generating a first alarm that the supply voltage of the first battery has been lowered in response to an output from the voltage detector.

The first alarm generator starts to generate the first alarm when the supply voltage of the first battery lowers to a reference voltage. The reference voltage is higher than the stop voltage. The first alarm stops when the CPU stops operating.

In the case, there is an additional advantage that the user can know the time or opportunity for exchanging the first battery becomes near.

Preferably, there are provided with a RAM checker for checking the RAM when the operational stop of the CPU is detected by the stop detector, and a RAM initializer for initializing the RAM when an error is found therein by the RAM checker.

There is an additional advantage that the user can avoid to use the wrong data.

A second alarm generator may be provided additionally. The second alarm generator generates a second alarm that the first battery needs to be exchanged when the power supply changer changes the first battery into the second battery.

There is an additional advantage that the user can know that the first battery required to be exchanged immediately.

BRIEF DESCRIPTION OF THE DRAWINGS

FIG. 1 is a time chart for showing a relationship between a CPU supply voltage and time of a conventional selective-calling radio receiver. radio receiver according to a first embodiment of the present invention.

FIG. 3 is a time chart for showing a relationship between a CPU supply voltage and time of the selective-calling radio receiver according to the first embodiment.

DESCRIPTION OF THE PREFERRED EMBODIMENTS

Figure 2:
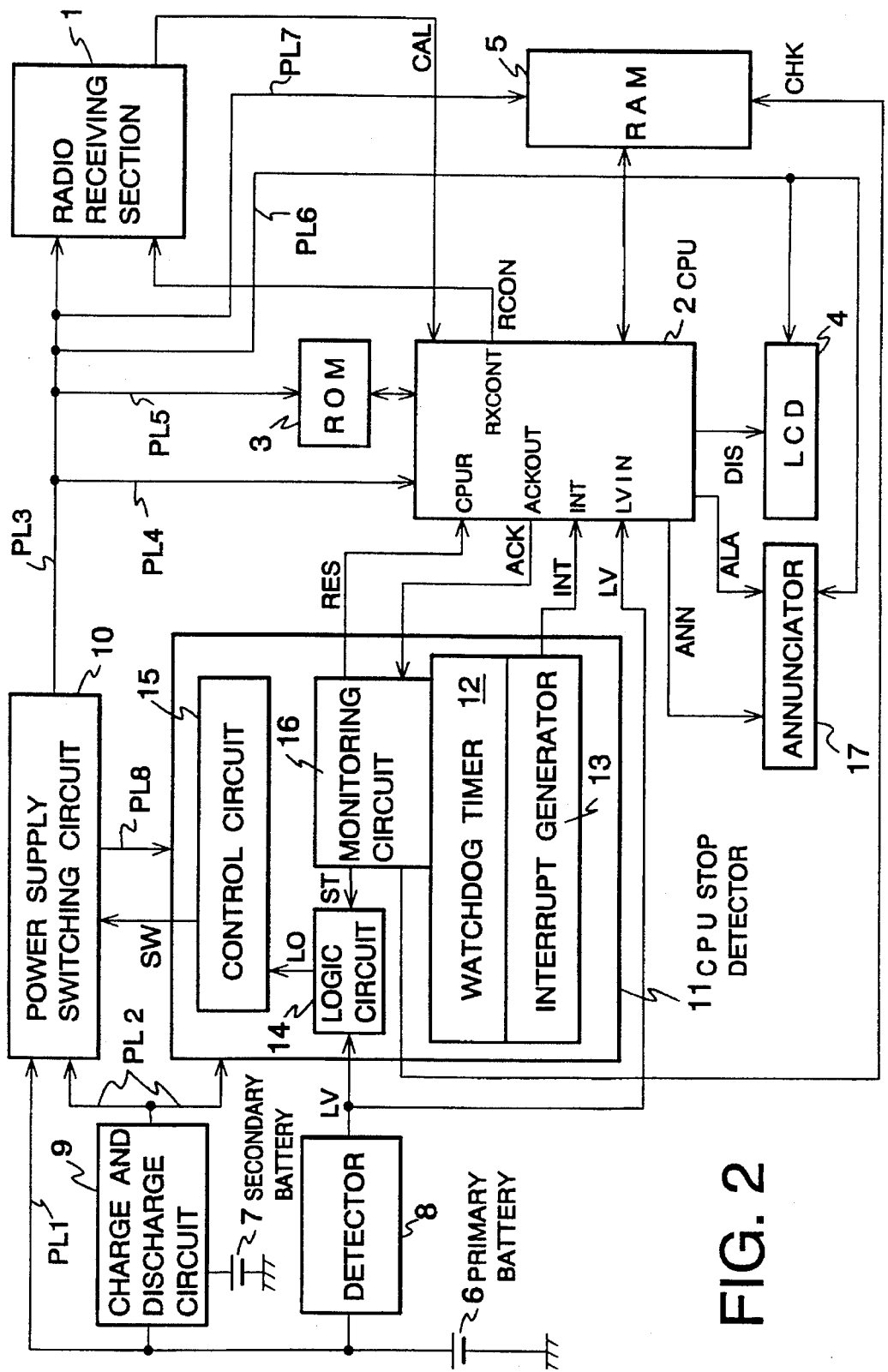

A preferred embodiment of the present invention will be described bellow while referring to the drawings attached.

A selective-calling radio receiver according to an embodiment of the present invention has a configuration as shown in FIG. 2.

In FIG. 2, a radio receiving section 1 receives a calling signal and demodulates it and sends a signal CAL to a CPU 2. The CPU 2 compares the signal CAL with individual selection numbers stored in a Read Only Memory (ROM) 3 and it controls a Liquid Crystal Display (LCD) 4 to display a sign or symbol for informing the receipt of the calling signal on the LCD 4. At the same time, the CPU 2 controls to drive an annunciator 17 such as a buzzer for annunciating the calling to the user or holder of the receiver.

If the calling signal thus received contains a message, the CPU 2 controls to store the message in a Random Access Memory (RAM) 5 and to display the message thus stored on the LCD 4.

To drive the receiver, there are provided with an exchangeable primary battery 6 such as a dry battery as a first power supply and a rechargeable secondary battery 7 as a second power supply. The secondary battery 7 can be charged by the primary battery 6 and discharged for driving the receiver through a charge and discharge circuit 9.

The primary battery 6 supplies its electric energy to the elements of the receiver during the "normal mode operation" in which the voltage of the primary battery 6 is higher than a second reference voltage or a CPU stop voltage $V_2$. The secondary battery 7 supplies its electric energy to the elements during the "low-voltage mode operation" in which the voltage of the primary battery 6 has reduced to the second reference voltage $V_2$.

As shown in FIG. 2, the electric energy from the primary battery 6 is supplied through a power line PL1 to the power supply switching circuit 10. Then, the energy is supplied to the radio receiving section 1 through a power line PL3. It is supplied to the CPU 2 through the line PL3 and a power line PL4. It is supplied to the ROM 3 through the line PL3 and a power line PL5. It is supplied to the LCD 4 and the annunciator 17 through the line PL3 and power lines PL6. It is supplied to the RAM 5 through the lines PL3 and a power line PL7. It is supplied to the CPU stop detector 11 through a power line PL8.

The electric energy from the secondary battery 7 is supplied through power lines PL2 to the power supply switching circuit 10 and the CPU stop detector 11. The energy is further supplied from the power supply switching circuit 10 to the radio receiving section 1, the CPU 2, the ROM 3, the LCD 4, the annunciator 17 and the RAM 5, respectively through the same power lines as in the case of the first battery 6.

Thus, the electric energies from the primary and secondary batteries 6 and 7 are switched or changed to be supplied selectively by the power supply switching circuit 10.

A detector 8 detects the supply voltage of the primary battery 6 and outputs a logic signal LV to the CPU 2 and a logic circuit 14 of a CPU stop detector 11. The signal LV has a logic state of high "H" during the supply voltage is higher than a first reference voltage $V_1$ and the logic state turns to low "L" when the supply voltage becomes equal to the voltage $V_1$. The voltage $V_1$ is a little higher than the second reference voltage $V_2$ or the CPU stop voltage.

The CPU stop detector 11 contains a watchdog timer 12, an interrupt generator 13, the logic circuit 14, a control circuit 15 for controlling the power supply switching circuit 10, and a monitoring circuit 16 for monitoring the watchdog timer 12.

The interrupt generator 13 generates an interrupt signal INT to send it to the CPU 2 for causing interrupts in the CPU 2 periodically. In response to the signal INT, the CPU 2 returns an acknowledgement signal ACK to the monitoring circuit 16.

The watchdog timer 12 starts to operate when the interrupt signal INT is sent. The monitoring circuit 16 checks or examines whether the signal ACK is received during a given period of time from the dispatch of the signal INT or not. The period of time is measured using the watchdog timer 12.

If the acknowledgment signal ACK is not received during the period, the monitoring circuit 12 judges the CPU 2 stop operating and sends a CPU stop signal ST to the logic circuit 14. At the same time, the monitoring circuit 12 sends a reset signal RES to the CPU 2. In response to the reset signal RES, the CPU 2 is reset and restart to operate. When the signal ACK is received during the period of time, the monitoring circuit 14 sends no signal to the logic circuit 14.

The logic circuit 14 logically operates based on the CPU stop signal ST thus sent and the low-voltage signal LV having a logic state "L" from the detector 8, and then sends a logic signal LO to the control circuit 15 based on the result of the logical operation. The signal SW indicates the power supply switching circuit 10 to switch from the first battery 6 to the second battery 7.

In response to the logic signal LO, the control circuit 15 controls the power supply switching circuit 10 so that the electric energy from the second battery 7 is supplied to the elements of the receiver such as the radio receiving section 1, the CPU 2 and others in place of that from the first battery 6.

On the other hand, the monitoring circuit 16 sends a signal CHK to the RAM 5 to store an information therein when it detects the stop of the CPU 2. The information contains a first data showing the stop of the CPU 2 and a second data for checking the RAM 5.

When the CPU 2 restarts to operate in response to the reset signal RES, it compares the second data stored in the RAM 5 with the initial data of the RAM 5 to check or examine whether any error is found in the RAM 5 at that time. If an error is found in the RAM 5, the CPU 2 initializes the RAM 5. If no error is found, in other words, the initial data of the RAM 5 is maintained without change, no initialization of the RAM 5 is carried out. No initial checking actions for the receiver is also carried out as if the CPU 2 did not stop to operate at all.

The minimum operable voltages of the CPU stop detector 11 and the RAM 5 are both equal to a voltage $V_3$ which is a little lower than the CPU stop voltage or second reference voltage $V_2$. Therefore, the CPU stop detector 11 and the RAM 5 can operate normally under such a low voltage, which means that no problem arises even if the CPU 2 stops to operate.

Figure 4:
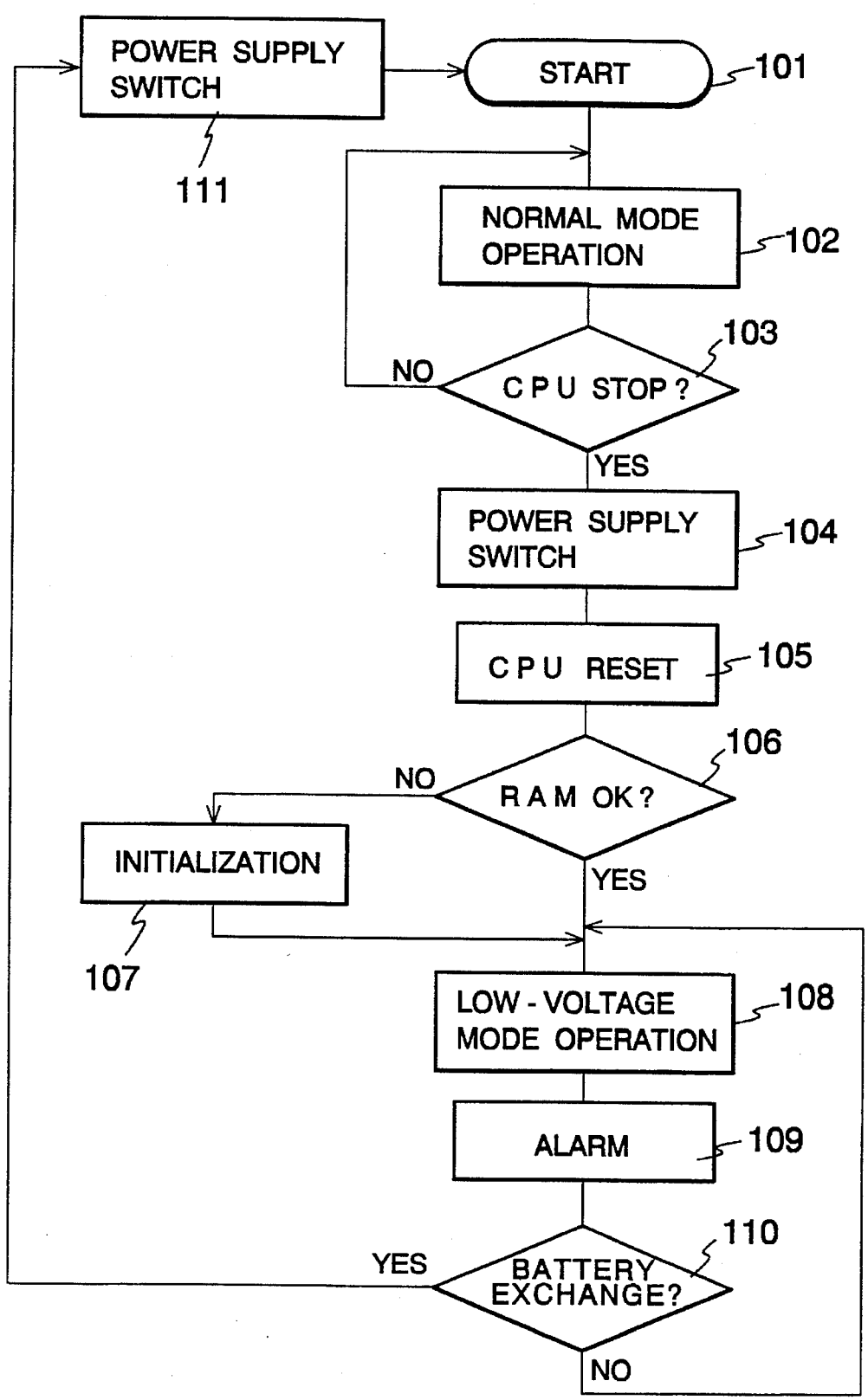
FIG. 4 is a flow chart for showing an operation sequence of the selective-calling radio receiver according to the first embodiment.

Next, the operation of the selective-calling radio receiver is described below referring to FIGS. 3 and 4.

The receiver starts to operate in Step 101. Initially, the voltage of the primary battery 6, which is detected by the detector 8, is higher than the first reference voltage $V_1$, so that the signal LV having a logic state "H" is sent to the logic circuit 14 from the detector 8. As a result, the control circuit 15 keeps the receiver in the "normal mode operation" (Step 102).

In other words, the primary battery 6 supplies its electric energy through the power supply switching circuit 10 to the respective elements of the receiver, or to the radio receiving section 1, CPU 2, ROM 3, LCD 4, RAM 5, CPU stop detector 11 and annunciator 17. At the same time, a part of the electric energy of the first battery 6 is used for charging the second battery 7 if required.

When the supply voltage of the primary battery 6 reduces to the first reference voltage $V_1$ due to its capacity drop, the logic state of the signal LV outputted from the detector 8 turns to "L". In response to the signal LV having the state "L", the CPU 2 sends a signal ALA to the annunciator 17 to produce an alarm which is named the "low-voltage alarm (LVA)" here. The holder of the receiver annunciated the voltage reduction of the primary battery 6 by the LVA.

On the other hand, the interrupt generator 13 of the CPU stop detector 11 generates the interrupt signal INT and sends it to the CPU 2. The monitoring circuit 16 checks whether the acknowledgement signal ACK is sent from the CPU 2 during the given period of time in response to the signal INT.

If the voltage of the primary battery 6 is higher than the second reference voltage $V_2$, the CPU 2 sends the acknowledgement signal ACK to the monitoring circuit 16 during the given period of time. Therefore, the monitoring circuit 16 judges the CPU 2 active and the receiver continues to operate in the normal mode (Step 103).

If the supply voltage of the primary battery 6 reduces still more and is equal to the second reference voltage $V_2$, the CPU 2 stops operating and as a result, no acknowledgement signal ACK is sent to the monitoring circuit 16 during the given period. Therefore, the monitoring circuit 16 judges the CPU 2 inactive and sends the CPU stop signal ST to the logic circuit 14.

The logic circuit 14 sends the switching signal SW to the power supply switching circuit 10 in response to both of the signal ST thus sent and the signal LV having the logic state "L". Then, the power supply switching circuit 10 switches the effective power supply from the primary battery 6 to the secondary battery 7 (Step 104).

After the switching, the second battery 7 supplies its electric energy to the respective elements of the receiver.

The switching time for switching between the batteries 6 and 7 is equal to the period of time from the stop of the CPU 2 to the finish of count in the watchdog timer 12, as shown in FIG. 3.

At the same time as the power supply switching, the monitoring circuit 16 sends the reset signal RES to the CPU 2 and sends the signal CHK to the RAM 5 to set a flag for recording the CPU stop in the RAM 5. The CPU 2 is reset in response to the signal RES (Step 105).

Since the flag is set in the RAM 5, the CPU 2 thus reset checks the RAM 5 whether there is an error in the RAM 5 at that time (Step 106). If any error is found, or the stored data is changed, the CPU 2 initializes the RAM 5 (Step 107) and then, the receiver starts to operate in the low-voltage mode (Step 108).

If no error is found, or the stored data is maintained without change, no initialization is carried out and the receiver starts to operate in the low-voltage mode at once (Step 108).

Subsequently, the CPU 2 sends the signal ALA again to the annunciator 17 to annunciate to the holder or user the alarm that the primary battery 6 should be exchanged immediately. The alarm is named the "battery exchange alarm" here.

The CPU 2 judges whether the primary battery 6 is exchanged through the detector 8 during the low-voltage mode operation (Step 110). If the battery 6 is exchanged, the detector 8 sends the signal LV having the logic state "H". In response to the signal LV, the power supply switching circuit 10 switches the effective power supply from the second battery 7 to the primary battery 6 (Step 111).

Subsequently, the receiver repeats the same operational steps as described above.

If the primary battery 6 is not exchanged, the receiver continues to operate in the low-voltage mode until the secondary battery 7 is exhausted.

In FIG. 3, the receiver is operating in the normal mode at the time A when the voltage of the primary battery 6 is higher than the first reference voltage $V_1$. The receiver starts to produce the low-voltage alarm at the time D when the supply voltage of the primary battery 6 is equal to the voltage $V_1$ and stops at the time C when the voltage is equal to the second reference voltage $V_2$.

At the time D, the CPU 2 is reset and the secondary battery 7 starts to supply its electric energy to the elements of the receiver in place of the primary battery 6. At the time E, the CPU 2 or receiver stops operating since the supply voltage of the secondary battery 7 lowers to the voltage $V_2$.

The switching time of the effective power supply is a period between the times C and D. The voltage of the primary battery 6 is equal to $V_2$ at the time C.

As explained above, with the selective-calling radio receiver of the embodiment, even if the voltage of the primary battery 6 lowers to the first reference voltage $V_1$, the primary battery 6 keeps to supply its electric energy to the elements of the receiver. When the supply voltage of the primary battery 6 lowers to the second reference voltage $V_2$, the secondary battery 7 starts to supply its electric energy to the elements and the primary battery 6 becomes inactive.

Accordingly, almost all the capacity of the primary battery 6 can be utilized effectively, in other words, the battery 6 can be exhausted nearly completely. This means that the remaining capacity of the battery 6 can be used effectively.

In addition, even if the CPU 2 stops operating due to the supply voltage drop of the primary battery 6, the CPU 2 can restart to operate in the low-voltage mode, immediately. The minimum or lowest operable voltages of the RAM 5 and CPU stop detector 11 are $V_3$ which is lower than the CPU stop voltage $V_2$, so that the operation of the CPU 2 can be monitored after the CPU 2 stops operating and the user data stored in the RAM 5 is surely maintained without change.

As a result, the receiver continues to operate without malfunction, which means that no troublesome reinput action of the data is required to the user.

In the embodiment, the CPU stop detector 11 is comprised of the watchdog timer 12, the interrupt generator 13, the logic circuit 14, the control circuit 15 and the monitoring circuit 16, however, any other configuration may be employed if it can detect the operational stop of the CPU 2.

In addition, the power supply switch circuit 10 is employed for switching the primary and secondary batteries 6 and 7, any other configuration may be employed if one of a plurality of power supplies selectively supplied to the elements of the receiver.

What is claimed is:

1. A selective-calling radio receiver comprising:

an exchangeable first battery as a first power supply source;

a second battery as a second power supply source, said second battery being capable of being charged by said first battery;

a CPU which stops operating when a supply voltage of said first battery lowers to a stop voltage, said CPU being unable to operate normally when said supply voltage is equal to or lower than said stop voltage;

a stop detector for detecting operational stop of said CPU due to drop of said supply voltage of said first battery, a minimum operable voltage of said stop detector being lower than said stop voltage; and a power supply switcher for switching a power supply source for said CPU and said stop detector between said first battery and said second battery;

wherein said first battery is used as said power supply source until said supply voltage of said first battery lowers to said stop voltage;

and wherein said power supply source is switched from said first battery to said second battery when said operational stop of said CPU is detected by said stop detector.

2. A selective-calling radio receiver as claimed in claim 1, further comprising:

an alarm generator for generating an alarm that said first battery needs to be exchanged when said power supply source is switched by said power supply switcher from said first battery to said second battery.

3. A selective-calling radio receiver as claimed in claim 1, wherein said second battery is used as a power supply source until said first battery, which is lowered in supply voltage, is replaced by a new first battery, thereby capacity of said first battery is used until said supply voltage of said first battery is lowered to said stop voltage.

4. A selective-calling radio receiver as claimed in claim 1, further comprising:

a voltage detector for detecting said supply voltage of said first battery; and a first alarm generator for generating a first alarm that said supply voltage of said first battery has been lowered in response to an output from said voltage detector;

wherein said first alarm generator starts to generate said first alarm when said supply voltage of said first battery lowers to a reference voltage, said reference voltage being higher than said stop voltage, and said first alarm is stopped when said CPU stops operating.

5. A selective-calling radio receiver as claimed in claim 4, further comprising:

a second alarm generator for generating a second alarm that said first battery needs to be exchanged when said power supply source is switched by said power supply switcher from said first battery to said second battery.

6. A selective-calling radio receiver as claimed in claim 1, further comprising:

a RAM for storing user data, a minimum operable voltage of said RAM being lower than said stop voltage of said CPU;

a RAM checker for checking said RAM when said operational stop of said CPU is detected by said stop detector; and a RAM initializer for initializing said RAM when an error is found in said RAM by said RAM checker.

7. A selective-calling radio receiver as claimed in claim 6, wherein said stop detector sends a reset signal to said CPU when it detects said operational stop of said CPU, and said CPU restarts to operate in response to said reset signal.

8. A selective-calling radio receiver as claimed in claim 1, wherein said stop detector comprises;

an interrupt generator for causing interrupts in said CPU periodically by sending an interrupt signal to said CPU; and an acknowledgement checker for checking whether an acknowledgement signal is sent from said CPU during a given period of time in response to said interrupt signal;

wherein said stop detector judges the CPU has stopped normal operation when said acknowledgement signal is not sent from said CPU during said given period of time.

9. A selective-calling radio receiver as claimed in claim 8, wherein said acknowledgement checker contains a watchdog timer for measuring said given period of time.

10. A selective-calling radio receiver comprising:

an exchangeable first battery as a first power supply;

a second battery as a second power supply, said second battery being able to be charged by said first battery;

a CPU which stops operating when said supply voltage of said first battery lowers to a stop voltage;

a RAM for storing user data, the minimum operable voltage of said RAM being lower than said stop voltage;

a stop detector for detecting operational stop of said CPU, the minimum operable voltage of said stop detector being lower than said stop voltage;

a power supply changer for switching from said first battery to said second battery as a power supply source and for selectively supplying one of electric energies of said first battery and said second battery to said CPU, said RAM and said stop detector, wherein said first battery supplies its electric energy to said CPU, said RAM and said stop detector until said supply voltage of said first battery lowers to said stop voltage, and said power supply changer switches from said first battery to said second battery as the power supply source when said operational stop of said CPU is detected by said stop detector, so that said second battery supplies its electric energy to said CPU, said RAM and said stop detector until said first battery, lowered in supply voltage, is replaced by a new first battery;

a RAM checker for checking said RAM when said operational stop of said CPU is detected by said stop detector; and a RAM initializer for initializing said RAM when an error is found in said RAM by said RAM checker.

11. A selective-calling radio receiver comprising:

an exchangeable first battery as a first power supply;

a second battery as a second power supply, said second battery being able to be charged by said first battery;

a CPU which stops operating when said supply voltage of said first battery lowers to a stop voltage;

a RAM for storing user data, the minimum operable voltage of said RAM being lower than said stop voltage;

a stop detector for detecting operational stop of said CPU, the minimum operable voltage of said stop detector being lower than said stop voltage;

a power supply changer for switching from said first battery to said second battery as a power supply source and for selectively supplying one of electric energies of said first battery and said second battery to said CPU, said RAM and said stop detector, wherein said first battery supplies its electric energy to said CPU, said RAM and said stop detector until said supply voltage of said first battery lowers to said stop voltage, and said power supply changer switches from said first battery to said second battery as the power supply source when said operational stop of said CPU is detected by said stop detector, so that said second battery supplies its electric energy to said CPU, said RAM and said stop detector until said first battery, lowered in supply voltage, is replaced by a new first battery;

a voltage detector for detecting said supply voltage of said first battery;

a first alarm generator for generating a first alarm that said supply voltage of said first battery has been lowered in response to an output from said voltage detector, said first alarm generator starts to generate said first alarm when said supply voltage of said first battery lowers to a reference voltage, said reference voltage being higher than said stop voltage, and said first alarm stopping when said CPU stops operating; and a second alarm generator for generating a second alarm that said first battery needs to be exchanged when said power supply changer switches from said first battery to said second battery.

12. A selective-calling radio receiver comprising:

an exchangeable first battery as a first power supply;

a second battery as a second power supply, said second battery being able to be charged by said first battery;

a CPU which stops operating when said supply voltage of said first battery lowers to a stop voltage;

a RAM for storing user data, the minimum operable voltage of said RAM being lower than said stop voltage;

a stop detector for detecting operational stop of said CPU, the minimum operable voltage of said stop detector being lower than said stop voltage;

a power supply changer for switching from said first battery to said second battery as a power supply source and for selectively supplying one of electric energies of said first battery and said second battery to said CPU, said RAM and said stop detector, wherein said first battery supplies its electric energy to said CPU, said RAM and said stop detector until said supply voltage of said first battery lowers to said stop voltage, and said power supply changer switches from said first battery to said second battery as the power supply source when said operational stop of said CPU is detected by said stop detector, so that said second battery supplies its electric energy to said CPU, said RAM and said stop detector until said first battery, lowered in supply voltage, is replaced by a new first battery;

an interrupt generator for causing interrupts in said CPU periodically by sending an interrupt signal to said CPU; and an acknowledgement checker for checking whether an acknowledgement signal is sent from said CPU during a given period of time in response to said interrupt signal;

wherein said stop detector judges the CPU has stopped normal operation when said acknowledgement signal is not sent from said CPU during said given period of time.

13. A selective-calling radio receiver as claimed in claim 12, wherein said acknowledgement checker contains a watchdog timer for measuring said given period of time.

14. A selective-calling radio receiver comprising:

an exchangeable first battery as a first power supply;

a second battery as a second power supply, said second battery being able to be charged by said first battery;

a CPU which stops operating when said supply voltage of said first battery lowers to a stop voltage;

a RAM for storing user data, the minimum operable voltage of said RAM being lower than stop voltage;

a stop detector for detecting operational stop of said CPU, the minimum operable voltage of said stop detector being lower than said stop voltage;

a power supply changer for switching from said first battery to said second battery as a power supply source and for selectively supplying one of electric energies of said first battery and said second battery to said CPU, said RAM and said stop detector, wherein said first battery supplies its electric energy to said CPU, said RAM and said stop detector until said supply voltage of said first battery lowers to said stop voltage, and said power supply changer switches from said first battery to said second battery as the power supply source when said operational stop of said CPU is detected by said stop detector, so that said second battery supplies its electric energy to said CPU, said RAM and said stop detector until said first battery, lowered in supply voltage, is replaced by a new first battery;

wherein said stop detector sends a reset signal to said CPU when it detects said operational stop of said CPU, and said CPU restarts to operate in response to said reset signal.

15. A selective-calling radio receiver comprising:

a replaceable first battery as a first power supply source;

a second battery as a second power supply source;

a processor which stops operating when a supply voltage of said first battery lowers to a stop voltage, said processor being unable to operate normally when said supply voltage is equal to or lower than said stop voltage;

a stop detector for detecting operational stop of said processor due to drop of said supply voltage of said first battery, a minimum operable voltage of said stop detector being lower than said stop voltage; and a power supply switcher for switching a power supply source for said processor and said stop detector between said first battery and said second battery;

wherein said first battery is used as said power supply source until said supply voltage of said first battery lowers to said stop voltage, and said power supply source is switched from said first battery to said second battery when said operational stop of said processor is detected by said stop detector.

* * * * *